United States Patent
Kuhnle et al.

(10) Patent No.: US 8,678,104 B2
(45) Date of Patent: Mar. 25, 2014

(54) HANDHELD POWER TOOL

(75) Inventors: Axel Kuhnle, Freiberg A.N. (DE);
Matthias Tauber, Boll-Eckwaelden (DE); Juergen Bochert, Stuttgart (DE);
Carsten Diem, Ludwigsburg (DE);
Willy Braun, Neustetten (DE);
Christian Wiedemann, Wiernsheim (DE); Joerg Kaiser, Schwieberdingen (DE); Patrick Heinen, Ludwigsburg (DE); Roger Hahn, Neuhausen (DE);
Thomas Speda, Holzgerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 510 days.

(21) Appl. No.: 12/959,035

(22) Filed: Dec. 2, 2010

(65) Prior Publication Data
US 2011/0139477 A1    Jun. 16, 2011

(30) Foreign Application Priority Data
Dec. 16, 2009  (DE) .......................... 10 2009 054 728

(51) Int. Cl.
*B25D 17/24*  (2006.01)

(52) U.S. Cl.
USPC ..................... 173/162.1; 173/162.2; 173/170; 173/211

(58) Field of Classification Search
USPC ............................ 173/162.1, 162.2, 170, 211
See application file for complete search history.

(56) References Cited

U.S. PATENT DOCUMENTS

| | | | | |
|---|---|---|---|---|
| 1,845,825 A | * | 2/1932 | Benedict | 173/162.2 |
| 2,875,731 A | * | 3/1959 | Settles et al. | 267/137 |
| 4,478,293 A | * | 10/1984 | Weilenmann et al. | 173/162.2 |
| 2008/0017395 A1 | * | 1/2008 | Sato | 173/162.2 |

* cited by examiner

*Primary Examiner* — Michelle Lopez
(74) *Attorney, Agent, or Firm* — Maginot, Moore & Beck

(57) ABSTRACT

The invention is based on a handheld power tool, having at least one vibration-cancelling device that has at least one cancellation spring and one cancellation mass. It is proposed that the cancellation mass is constructed of at least one first mass part and at least one second mass part.

19 Claims, 7 Drawing Sheets

(Section A-A)

(Section B-B)

(Section C-C)

(Section D-D)

HANDHELD POWER TOOL

CROSS-REFERENCE TO RELATED APPLICATION

This application is based on German Patent Application 10 2009 054 728.2 filed on Dec. 16, 2009.

BACKGROUND OF THE INVENTION

1. Field of the Invention

The invention is based on a handheld power tool, having at least one vibration-cancelling device that has at least one cancellation spring and one cancellation mass.

2. Description of the Prior Art

From European Patent Disclosure EP 1 736 283 A2, a handheld power tool having at least one vibration-cancelling device that has at least one cancellation spring and one cancellation mass is already known.

SUMMARY OF THE INVENTION

It is proposed that the cancellation mass is constructed of at least one first and one second mass part. The term "handheld power tool" should be understood in particular to mean all handheld power tools that appear useful to one skilled in the art, in particular such as impact drills, wrecking hammers, rotary hammers, impact hammers, rotary impact drills, and/or advantageously rotary and/or chisel hammers. The term "vibration-cancelling device" should be understood in particular to mean a device which in at least one operating state generates a force on a handheld power tool housing and/or a mechanism housing and in particular on at least one handle of the handheld power tool, which force acts counter to vibration, particularly of the handheld power tool housing. As a result, the vibration-cancelling device enables advantageously low-vibration operation of the handheld power tool. Preferably, the vibration-cancelling device works passively, or in other words does not require energy, except for the vibrational energy. The term "cancellation spring" should be understood in particular to mean a spring that is intended for transmitting a force, in particular directly, to the cancellation mass that accelerates and/or decelerates the cancellation mass. Advantageously, the cancellation spring is embodied as a helical compression spring. Alternatively or in addition, the cancellation spring could have a rectangular cross section perpendicular to a spring direction, or a plurality of cancellation springs could be internested and/or disposed coaxially. Also alternatively or in addition, the cancellation spring could be embodied as some other torsion, bending, tension and/or gas spring appearing useful to one skilled in the art. The term "spring direction" should be understood in particular to mean at least one direction in which the cancellation spring must be stressed, so as to be able to elastically store the most energy. Advantageously, the cancellation spring is embodied as elastically deformable in the spring direction by at least 25% of its length in the unstressed state. The term "cancellation mass" should be understood in particular to mean a unit that is intended, by inertia by means of an acceleration force and/or a deceleration force, for reducing the vibration, particularly of the handheld power tool housing, advantageously by vibrating in a manner that is shifted by a phase angle to the handheld power tool housing. The term "intended" should be understood in particular to mean especially equipped and/or designed. The term "mass part" should be understood in particular to mean a one-piece element of the vibration-cancelling device that is movable by the cancellation spring and has at least 10%, advantageously at least 20%, of a total mass that is movable by the cancellation spring. Preferably, the mass part is made of a metal. By means of the embodiment according to the invention, it is structurally simple to furnish an especially sturdy, compact, economical handheld power tool which makes especially low-vibration operation possible.

In a further feature, it is proposed that the first mass part has at most a mass four times as great as the second mass part, as a result of which an advantageous total mass of the cancellation mass can be achieved especially inexpensively. Preferably, the heaviest mass part has at most a mass four times as great as the lightest mass part. Advantageously, the mass parts have a density of at least 4000 kg/m$^3$, and especially advantageously at least 7000 kg/m$^3$. Preferably, the mass parts are produced from a single workpiece.

It is furthermore proposed that at least one of the mass parts, in at least one direction, has for the most part a homogeneous cross section, as a result of which the mass parts can be produced especially inexpensively, in particular by being cut down from a rod produced by an extrusion method. The phrase "a homogeneous cross section in at least one direction" should be understood in particular to mean that the mass parts have an identical cross section in planes that are oriented perpendicular to that direction. Advantageously, the cross section is always within a projection face in that direction. The phrase "for the most part" should be understood in this connection to mean in particular that the mass parts have the homogeneous cross section over at least 50%, advantageously at least 75%, and especially advantageously at least 90% of a distance in that direction.

It is also proposed that at least one of the mass parts in at least one direction for the most part has a standardized cross section, as a result of which the mass parts can be economically produced from especially inexpensive blanks. The term "standardized cross section" should be understood in particular to mean a cross section that a standardized component, which is advantageously produced by an extrusion method has. Advantageously, the mass parts have a cross section in accordance with the DIN standards EN 10 058, EN 10 059, EN 10 130, EN 10 278, or some other standard that appears useful to one skilled in the art.

It is furthermore proposed that the mass parts are screwed together, as a result of which an especially stable, easily maintained connection can be achieved structurally simply.

It is also proposed that the mass parts are joined together in material-locking fashion, which makes especially inexpensive production possible. The phrase "joined in material-locking fashion" should be understood in particular to mean that the mass parts are held together by atomic or molecular forces, as for instance in soldering, welding, adhesive bonding, and/or vulcanization.

In an advantageous embodiment of the invention, it is proposed that the mass parts are braced to one another, as a result of which an especially inexpensive, durable connection can be achieved. The expression "braced to one another" should be understood in particular to mean that the mass parts have a force-locking connection with one another; that is, between the mass parts and/or to mass parts and a further component, even in a state without stress from outside, there is a force that creates friction which prevents motion of the mass parts relative to one another.

Moreover, the handheld power tool has a mechanism housing with a housing cap that has a securing device which in at least one operating state at least partly secures the vibration-cancelling device. The term "mechanism housing" should be understood in particular to mean a housing in which at least one drive mechanism is disposed in protected fashion. Advantageously, the mechanism housing is embodied at least partly in one piece with the handheld power tool housing. The term "housing cap" should be understood in particular to mean an element of the mechanism housing that is embodied so that it can be separated nondestructively from some other element of the mechanism housing, especially a housing shell. Advantageously, the vibration-cancelling device and the drive mechanism are disposed in a chamber which the housing cap closes. That is, the vibration-cancelling device is disposed on an inside of the housing cap. As a result, it is structurally simply protected especially advantageously against external effects such as dirt and mechanical damage. Advantageously, the chamber is embodied as a grease chamber of the handheld power tool. Advantageously, the housing cap is intended for closing an opening, provided in particular for installing the drive mechanism, in the other element of the mechanism housing. Advantageously, the housing cap is free of bearing forces of the drive mechanism. Especially advantageously, the housing cap transmits primarily forces of the vibration-cancelling device, and in particular forces that act on the housing cap from outside. The term "drive mechanism" should be understood in particular to mean a mechanism which converts a motion of a drive motor into a working motion, in particular a hammering motion. The term "securing device" should be understood in particular to mean a means that is intended for exerting a force on the vibration-cancelling device that secures at least one element of the vibration-cancelling device, preferably a retention part, relative to the installed housing cap. Advantageously, the securing device is embodied at least partly in one piece with the housing cap. The securing device is embodied as a groove, as part of a screw connection, as part of a detent connection, and/or as part of some other connection that appears useful to one skilled in the art. In particular, the term "close" should be understood to mean that the housing cap, in an operationally ready state, covers an opening of the other element of the mechanism housing, in particular of the housing shell. As a result, the housing cap protects the chamber from getting dirty; that is, it prevents dirt and in particular dust from reaching the drive mechanism through the opening. The term "retention part" should be understood in particular to mean an element of the vibration-cancelling device which, in an installed operating state, is connected to the housing cap immovably relative to the housing cap. Advantageously, the retention part conducts forces, generated by an acceleration, onward from the cancellation spring to the housing cap. In particular, the retention part is a component embodied separately from the mechanism housing and advantageously from a housing cap. In particular, by dispensing with an additional cancellation cap, an especially lightweight handheld power tool, with effective heat dissipation from the drive mechanism, is possible.

In an advantageous embodiment of the invention, it is proposed that the vibration-cancelling device has at least one spring receptacle, which is joined to the cancellation mass in form-locking, material-locking and/or preferably force-locking fashion, as a result of which an especially inexpensive, easily maintained and space-saving connection is structurally simply possible. The term "spring receptacle" should be understood in particular to mean an element of the vibration-cancelling device that is disposed in a force flow between the cancellation spring and the cancellation mass. Advantageously, the spring receptacle is joined mechanically solidly to the cancellation mass. Preferably, the spring receptacle is movable relative to the mechanism housing. The term "form lock" should be understood in particular to mean a connection which across at least one face transmits a force in a force direction, which has an average orientation essentially perpendicular to the force direction. In the process, a spatial embodiment of the spring receptacle and of the cancellation mass preferably prevents motion of the spring receptacle relative to the cancellation mass.

It is also proposed that the housing cap and the vibration-cancelling device form a unit that can be preassembled, as a result of which less installation effort and expense can advantageously be attained. The phrase "form a unit that can be preassembled" should be understood in particular to mean that upon installation, especially before the housing cap is secured to the mechanism housing, the housing cap and the vibration-cancelling device can be connected solidly to one another. As a result, the housing cap and the vibration-cancelling device can be connected to form an installable unit. Advantageously, the housing cap and the vibration-cancelling device can be joined to one another in such a way that they can be installed together. Especially advantageously, the housing cap and the vibration-cancelling device can be joined to one another in such a way that they can transmit the acceleration force and/or a contrary force to the acceleration force.

BRIEF DESCRIPTION OF THE DRAWINGS

The invention will be described in detail below in terms of preferred embodiments in conjunction with the drawings, in which.

DESCRIPTION OF THE PREFERRED EMBODIMENTS

Figure 1:
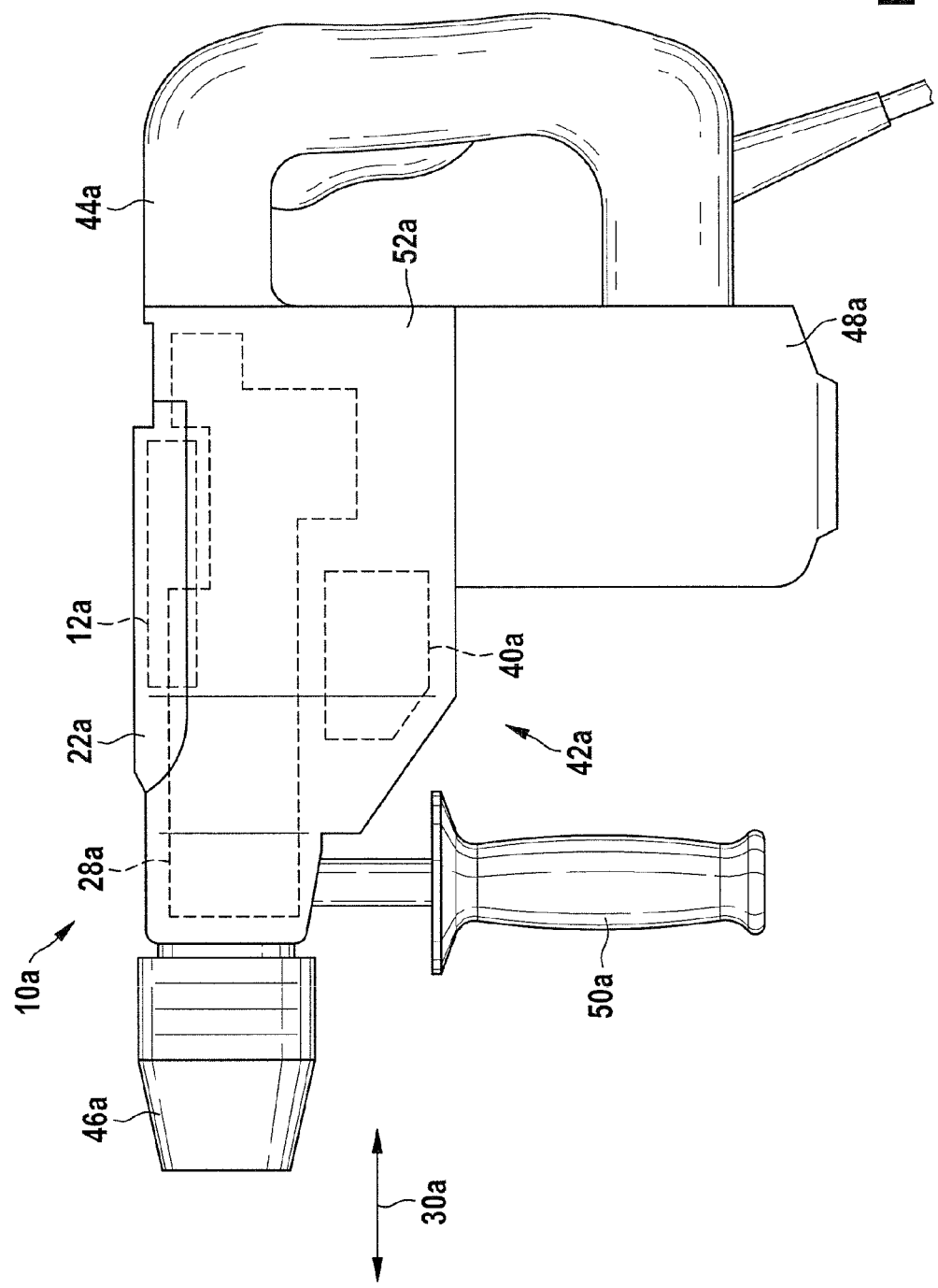
FIG. 1 shows a handheld power tool of the invention with a vibration-cancelling device, which includes a cancellation mass with a standardized middle mass part.

FIG. 1 shows a handheld power tool 10a of the invention, with a vibration-cancelling device 12a, a drive mechanism 40a, and a mechanism housing 42a that has a metal housing cap 22a. The handheld power tool 10a is embodied as a drill-and-chisel hammer. The mechanism housing 42a encloses a chamber 24a shown in FIG. 2, in which the drive mechanism 40a and the vibration-cancelling device 12a are disposed. The handheld power tool 10a furthermore has a main handle 44a, a tool insert fastener 46a, a motor housing 48a, and a supplementary handle 50a. The main handle 44a is joined, on a side of the mechanism housing 42a remote from the tool insert fastener 46a, to the mechanism housing 42a and the motor housing 48a. The supplementary handle 50a is joined to the mechanism housing 42a on a side toward the tool insert fastener 46a.

Figure 2:
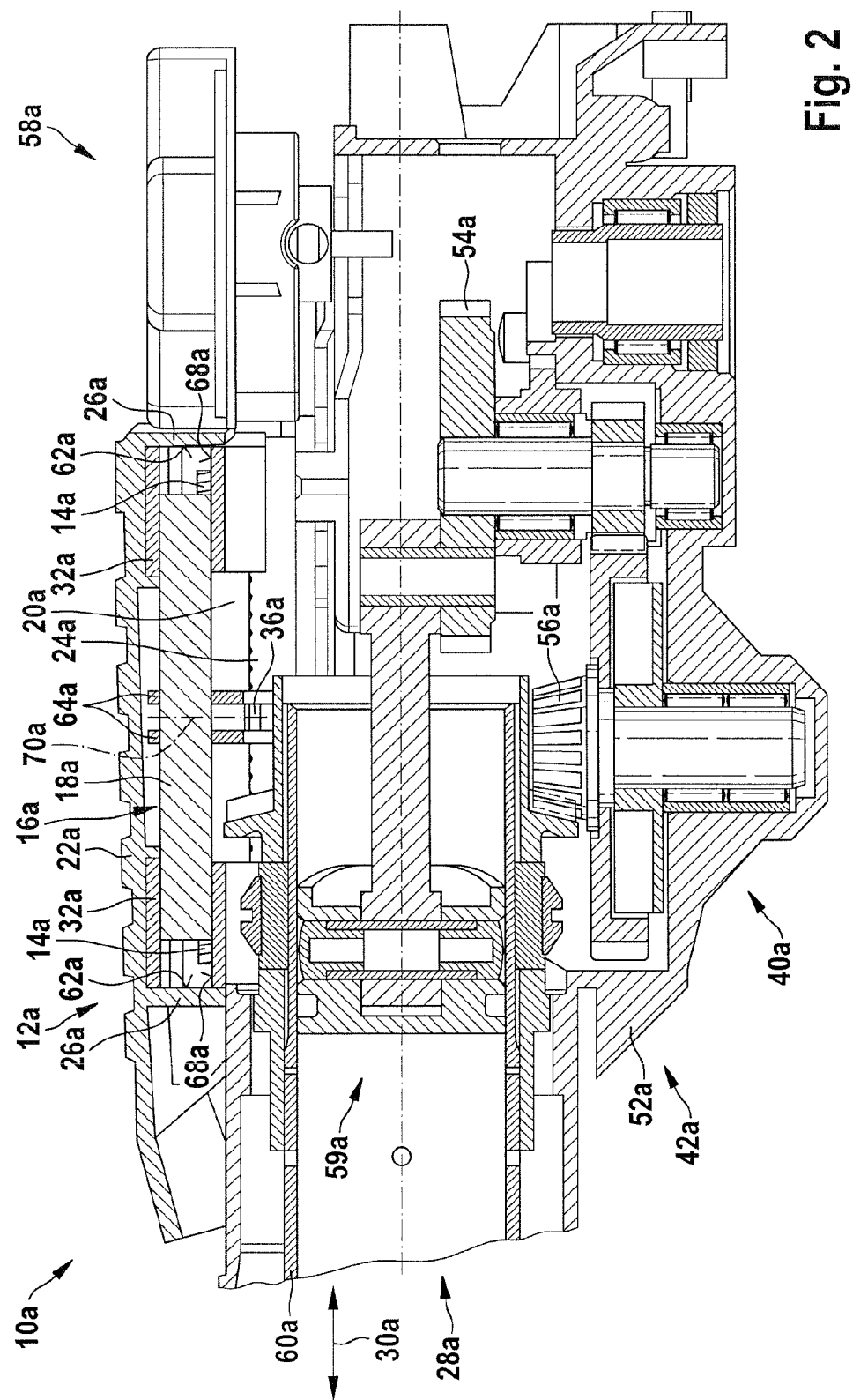
FIG. 2 shows a section through the handheld power tool of FIG. 1.
Figure 3:
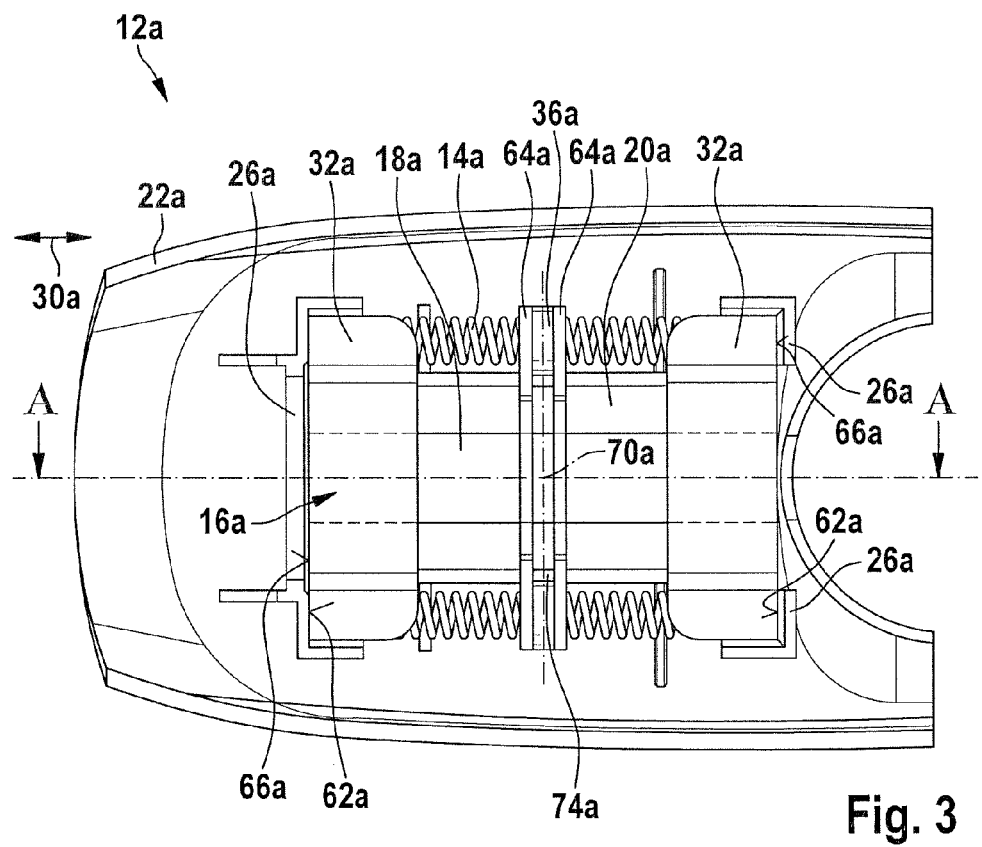
FIG. 3 shows a housing cap and the vibration-cancelling device of the handheld power tool of FIG. 1.
Figure 4:
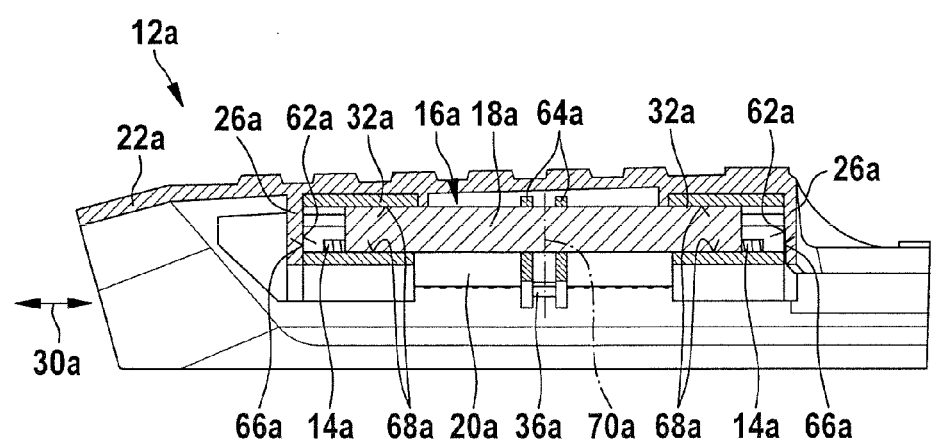
FIG. 4 shows a section (A-A) through the housing cap and the vibration-cancelling device.

FIG. 2 shows a section through the mechanism housing 42a, which besides the housing cap 22a has a housing shell 52a. The vibration-cancelling device 12a and the drive mechanism 40a are disposed in the chamber 24a. The drive mechanism 40a has a percussion mechanism 28a, a first and second gear element 54a, 56a for a drilling mode, and a switchover mechanism 58a. The percussion mechanism 28a is embodied as a hammer percussion mechanism. The first gear element 54a is additionally embodied as an eccentric element of the percussion mechanism 28a. The percussion mechanism 28a furthermore has a piston 59a, a hammer tube 60a, and a beater and a riveting die, not shown. The second gear element 56a drives the hammer tube 60a so as to be rotated. The rotary motion of the hammer tube 60a can be switched off, in a manner that appears useful to one skilled in the art, by the switchover mechanism 58a.

The housing cap 22a of the mechanism housing 42a is disposed on a side of the housing shell 52a facing the motor housing 48a. The housing cap closes an installation opening located there and thus closes the chamber 24a. The handheld power tool 10a has a seal, not shown in detail, which is disposed between the housing cap 22a and the housing shell 52a. As a result, the vibration-cancelling device 12a and the drive mechanism 40a are protected from getting dirty. The chamber 24a is embodied as a grease chamber; that is, shared, permanent lubrication is ensured in the chamber. The vibration-cancelling device 12a and the drive mechanism 40a are disposed in the chamber 24a that the housing cap 22a closes.

As FIGS. 3 through 7 show, the housing cap 22a has three securing means 26a. The securing means 26a are embodied as integrally formed-on ribs. The securing means 26a have securing faces 62a oriented perpendicular to a spring direction 30a. The securing means 26a, after assembly of a unit, that is, once the vibration-cancelling device 12a has been inserted into the cap, and during operation, secure the vibration-cancelling device 12a in the spring direction 30a. To that end, upon installation, the vibration-cancelling device 12a is compressed in the spring direction 30a and inserted into the housing cap 22a. As a result, cancellation springs 14a of the vibration-cancelling device 12a, as a result of prestressing in the spring direction 30a after installation of a unit and during operation, exert a securing force on the housing cap 22a. The securing force secures the vibration-cancelling device 12a to the housing cap 22a in force-locking fashion perpendicular to the spring direction 30a. Thus the vibration-cancelling device 12a and the housing cap 22a form a unit that can be preassembled; that is, the vibration-cancelling device 12a and the housing cap 22a, together and separately from the housing shell 52a, form an intrinsically stable unit.

After installation of the housing cap 22a on the housing shell 52a, the housing shell 52a, in a region not shown in detail, exerts a securing force on the vibration-cancelling device 12a. The securing force acts perpendicular to the spring direction 30a. Alternatively or in addition, the vibration-cancelling device 12a could be locked, screwed, or glued to the housing cap 22a, and/or joined to it in some other way that appears useful to one skilled in the art.

The percussion mechanism 28a and the vibration-cancelling device 12a are disposed partly in the same planes, which are oriented perpendicular to a spring direction 30a; that is, the percussion mechanism 28a and the vibration-cancelling device 12a are disposed partly adjacent one another. A region of the vibration-cancelling device 12a oriented toward the tool insert fastener 46a is disposed between the housing cap 22a and the percussion mechanism 28a. This region is free of functional components, except for the vibration-cancelling device 12a.

The vibration-cancelling device 12a is embodied mirror-symmetrically in a state of repose. It has the four cancellation springs 14a, one cancellation mass 16a, two retention parts 32a, two spring receptacles 36a, and two spring receptacle fasteners 64a. The two retention parts 32a are embodied as identical parts; that is, they have the same shape, but in a mirror image to one another. Moreover, the retention parts 32a have a slight oversize compared to the housing cap 22a. Outsides 66a of the retention parts 32a that face toward or away from the tool insert fastener 46a secure the vibration-cancelling device 12a in the housing cap 22a. The cancellation springs 14a, the cancellation mass 16a, the two spring receptacles 36a, and the two spring receptacle fasteners 64a are disposed between the retention parts 32a. The spring receptacles 36a and the spring receptacle fasteners 64a are made at least in part of plastic.

The retention parts 32a have guide faces 68a, which during operation guide the cancellation mass 16a in the spring direction 30a. To that end, the retention parts 32a enclose the cancellation mass 16a at a plane which is embodied perpendicular to the spring direction 30a. In this exemplary embodiment, the retention parts 32a enclose the cancellation mass 16a entirely. Alternatively, the retention parts 32a could enclose the cancellation mass 16a by more than 180°. The retention parts 32a guide the cancellation mass 16a on faces that are located farthest away from a center of gravity 70a of the cancellation mass 16a, and as a result, low guide forces and only slight friction can be attained. Alternatively or in addition, a housing cap could also guide the cancellation mass 16a and/or the cancellation spring 14a. The retention parts 32a furthermore each have spring fasteners 72a, which secure the cancellation springs 14a. To that end, the cancellation springs 14a are screwed onto the spring fasteners 72a.

Figure 5:
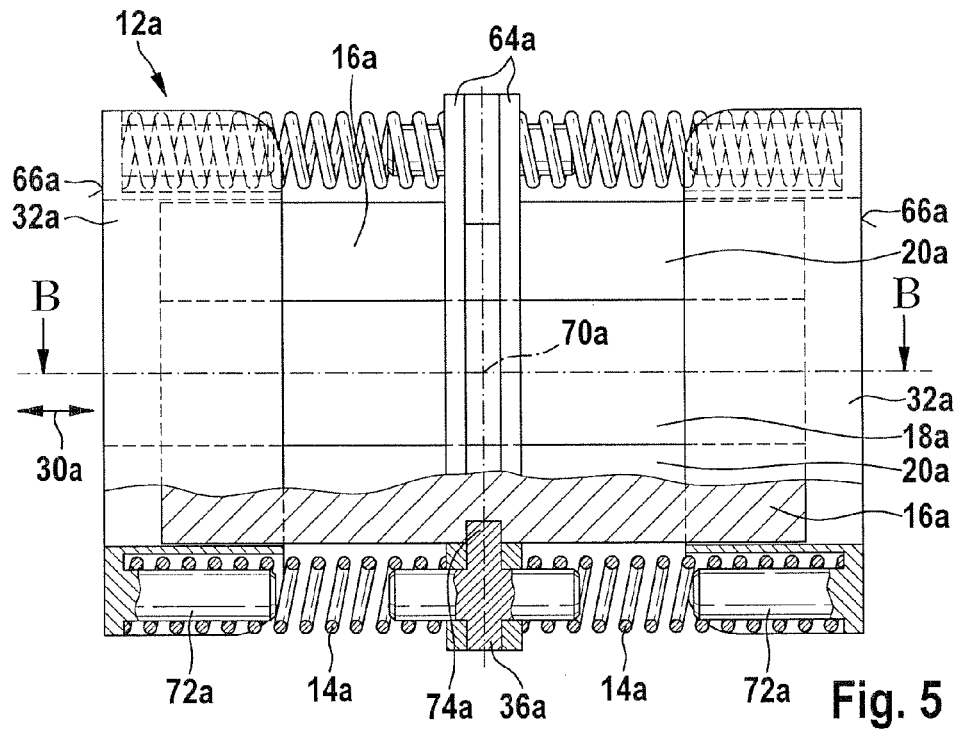
FIG. 5 is a fragmentary section through the vibration-cancelling device of the handheld power tool of FIG. 1 in a top view.
Figure 6:
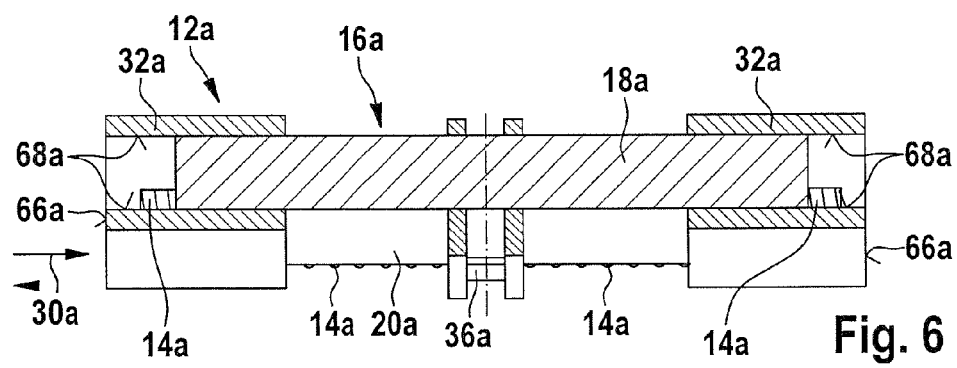
FIG. 6 is a section (B-B) of the vibration-cancelling device of the handheld power tool of FIG. 1 in a front view.

The four cancellation springs 14a are mechanically solidly joined each on one side to the retention parts 32a and on one side to the spring receptacles 36a. The spring receptacles 36a, viewed perpendicular to the spring direction 30a, have a cross-shaped cross section (FIG. 5). On a side toward the center of gravity 70a of the cancellation mass 16a, the spring receptacles 36a extend into recesses 74a in the cancellation mass 16a. In the process, the spring receptacles 36a are braced on the cancellation mass 16a. In an installation process, the spring receptacle fasteners 64a are thrust onto the cancellation mass 16a and fix the spring receptacles 36a in such a way that a form-locking connection is created between the spring receptacles 36a and the cancellation mass 16a. The spring forces of the cancellation springs 14a secure the spring receptacle fastener 64a.

In addition, the vibration-cancelling device 12a can have damping elements, not shown in detail, which damp an impact of the cancellation mass 16a against an end stop. For instance, the damping elements could be disposed between the spring receptacles 36a and the retention parts 32a in the interior of the cancellation springs 14a in a guide of the retention parts 32a, or on the housing cap 22a.

Figure 7:
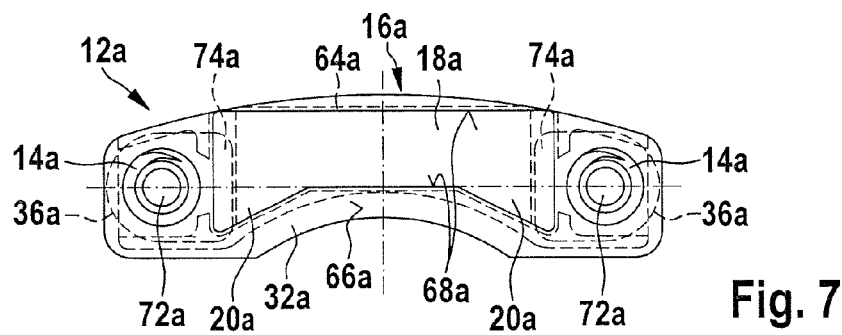
FIG. 7 shows the vibration-cancelling device of the handheld power tool of FIG. 1 in a side view.

FIGS. 5 and 7 show that the cancellation mass is constructed of a first mass part 18a and two second mass parts 20a. The first mass part 18a is disposed centrally, in the spring direction 30a, in the vibration-cancelling device 12a. In the spring direction 30a, except for the recesses 74a in the cancellation mass 16a for the spring receptacles 36a, the first mass part has a homogeneous cross section, standardized to DIN EN 10 278. On a side toward the drive mechanism 40a, the first mass part 18a and the two second mass parts 20a are joined together in material-locking fashion by adhesive bonding. The two second mass parts 20a have a triangular homogeneous cross section in the spring direction 30a. The cross sections of the mass parts 18a, 20a are shaped by means of an extrusion method. The mass parts 18a, 20a are cut from a rod by a machine and then provided with recesses 74a for receiving spring receptacles. After that, the mass parts 18a, 20a are glued together.

In FIGS. 8 through 13, four further exemplary embodiments of the invention are shown. To distinguish among the exemplary embodiments, the letter a in the reference numerals for the exemplary embodiment of FIGS. 1 through 7 has been replaced by the letters b through e in the reference numerals of the exemplary embodiments in FIGS. 8 through 13. The following descriptions are limited essentially to the distinctions among the exemplary embodiments, and for components, characteristics and functions that remain the same, the description of the other exemplary embodiments, in particulars in FIGS. 1 through 7, can be referred to.

Figure 8:
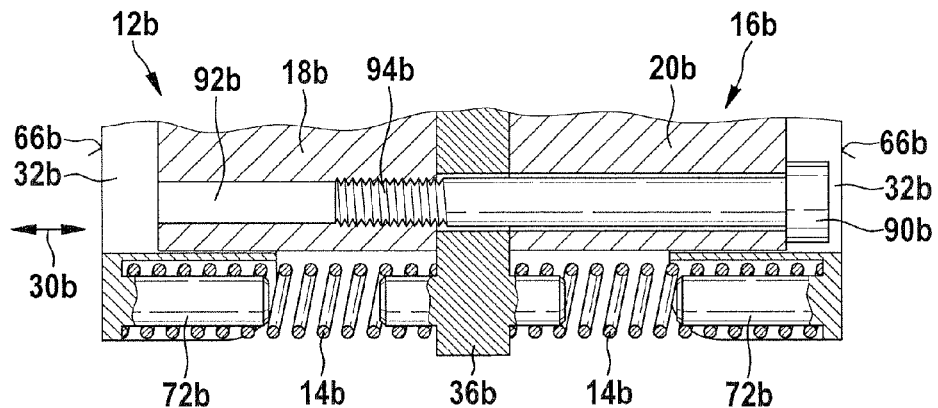
FIG. 8 is a fragmentary section through an alternative exemplary embodiment of the vibration-cancelling device of the handheld power tool of FIG. 1 in a top view with screwed-together mass parts.

The exemplary embodiment of FIG. 8 relates, as described in the exemplary embodiment of FIGS. 1 through 7, to a handheld power tool of the invention, having a vibration-cancelling device 12b, shown in FIG. 8. The vibration-cancelling device 12b has four cancellation springs 14b, one cancellation mass 16b, and one spring receptacle 36b. The cancellation mass 16b is constructed of a first mass part 18b and a second mass part 20b. The spring receptacle 36b is disposed between the two mass parts 18b, 20b. The spring receptacle 36b and two mass parts 18b, 20b are joined together or screwed to one another by a connecting means 90b. To that end, the connecting means 90b extends through a recess 92b in the second mass part 20b and the spring receptacle 36b and engages a thread 94b made in the first mass part 18b. Alternatively, the vibration-cancelling device 12b could have a plurality of connecting means.

Figure 9:
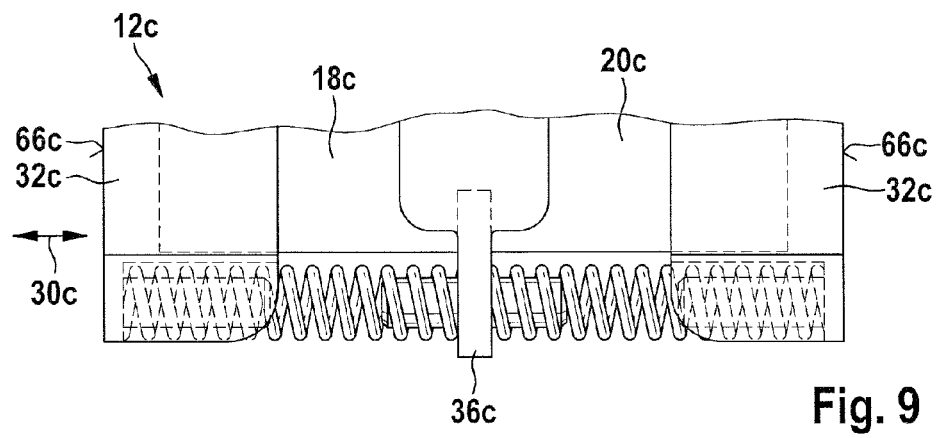
FIG. 9 shows part of a further alternative exemplary embodiment of the vibration-cancelling device of the handheld power tool of FIG. 1 in a top view, with mass parts joined in material-locking fashion.

The exemplary embodiment of FIG. 9 relates, as described in the exemplary embodiment of FIGS. 1 through 7, to a handheld power tool of the invention, having a vibration-cancelling device 12c, shown in FIG. 9. The vibration-cancelling device 12c has four cancellation springs 14c, one cancellation mass 16c, and one spring receptacle 36c. The cancellation mass 16c is constructed of a first mass part 18c and a second mass part 20c. In manufacture, the spring receptacle 36c is injected between the two mass parts 18c, 20c. As a result, the spring receptacles 36c and the mass parts 18c, 20c are joined in material-locking fashion to one another. The spring receptacle 36c comprises a plastic. Alternatively or in addition, a mass part could also be integrally injection-molded onto a spring receptacle.

Figure 10:
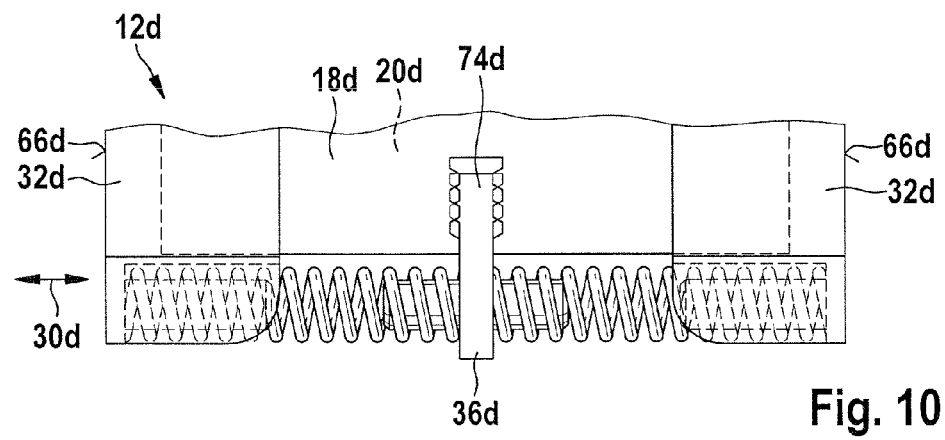
FIG. 10 shows part of a further alternative exemplary embodiment of the vibration-cancelling device of the handheld power tool of FIG. 1 in a top view, with braced mass parts.

The exemplary embodiment of FIG. 10 relates, as described in the exemplary embodiment of FIGS. 1 through 7, to a handheld power tool of the invention, having a vibration-cancelling device 12d, shown in FIG. 10. The vibration-cancelling device 12d has four cancellation springs 14d, one cancellation mass 16d, and two spring receptacles 36d. The cancellation spring 16d is constructed of a first mass part 18d and two second mass parts 20d. The cancellation mass 16d is accordingly subdivided into mass parts 18d, 20d, as shown in FIG. 7 and described in the exemplary embodiment of FIGS. 1 through 7. The spring receptacle 36d is disposed centrally in the spring direction 30d on the outsides of the cancellation mass 16d. The spring receptacle 36d engages recesses 74d in the cancellation mass 16d. The spring receptacle 36d and the mass parts 18d, 20d are braced to one another there. Thus the spring receptacle 36d joins the mass parts 18d, 20d to one another. The spring receptacles 36d are made from stamped sheet metal.

Figure 11:
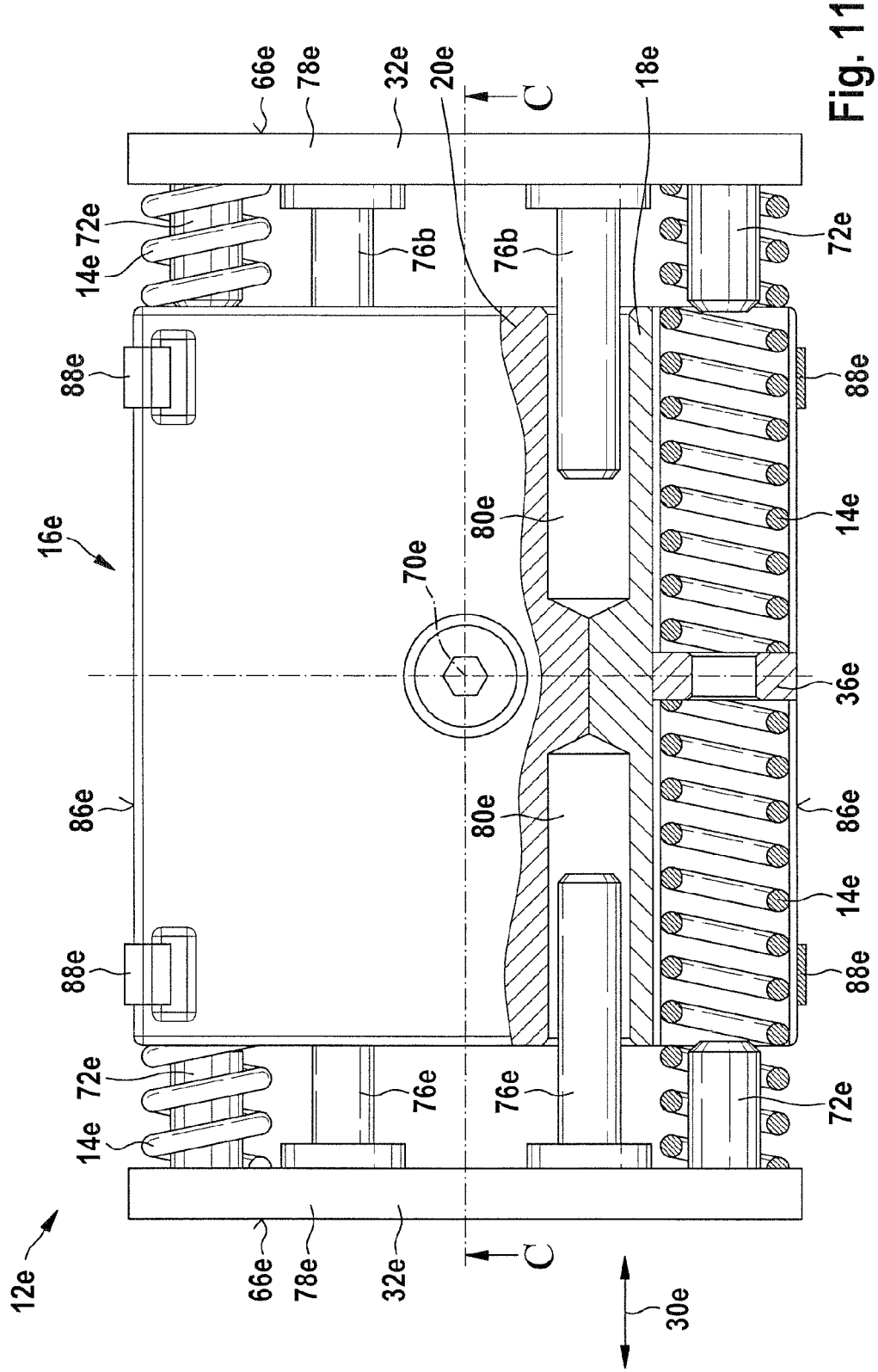
FIG. 11 is a fragmentary section through an alternative exemplary embodiment of the vibration-cancelling device of FIG. 1, with a cancellation mass that is connected with detent hooks.
Figure 12:
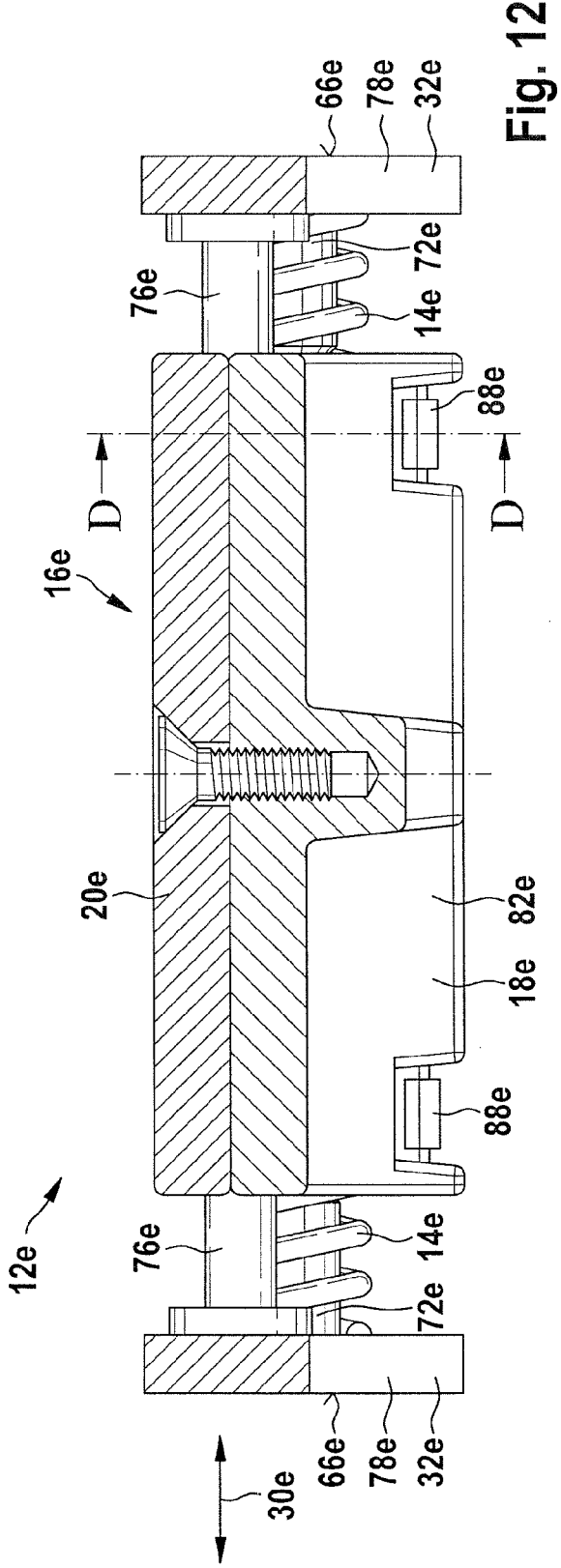
FIG. 12 is a section (C-C) of the vibration-cancelling device of FIG. 11 in a front view.
Figure 13:
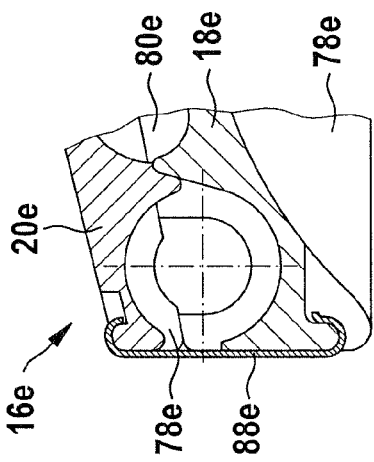
FIG. 13 is a fragmentary section (D-D) of the vibration-cancelling device of FIG. 11 in a side view.

The exemplary embodiment of FIGS. 11 through 13 relates, as described in the exemplary embodiment of FIGS. 1 through 7, to a handheld power tool of the invention, having a vibration-cancelling device 12e, shown in FIGS. 11 through 13. The vibration-cancelling device 12e has four cancellation springs 14e, one cancellation mass 16e, and two retention parts 32e. The retention parts 32e are embodied as identical parts. Each retention part 32e has two spring fasteners 72e and two guide means 76e. The guide means 76e are embodied as rods integrally formed onto base plates 78e of the retention parts 32e. The guide means 76e engage recesses 80e in the cancellation mass 16e and guide the cancellation mass in the spring direction 30e. Alternatively, guide means 76e could also completely penetrate the cancellation mass 16e in the spring direction 30e.

The cancellation mass 16e has a first and a second mass part 18e, 20e. The first mass part 18e, oriented toward a percussion mechanism 28e and shown toward the bottom of FIG. 12, is approximately the same weight as the second mass part 20e. In general, the heaviest mass part has at most a mass four times as great as the lightest mass part.

A separator between the two mass parts 18e, 20e extends parallel to the spring direction 30e and essentially parallel to the main extent of the cancellation mass 16e. Alternatively, a separator could also be disposed perpendicular to the main extent of a cancellation mass or perpendicular to the spring direction. The mass parts 18e, 20e are screwed centrally to one another. Moreover, the mass parts 18e, 20e are braced to one another on outsides 86e by means of detent hooks 88e. The cancellation mass 16e encloses the cancellation springs 14e in a plane that is oriented perpendicular to the spring direction 30e by more than 180°, and in this exemplary embodiment completely encloses it. In the enclosed regions, the cancellation mass 16e guides the cancellation springs 14e.

The foregoing relates to preferred exemplary embodiments of the invention, it being understood that other variants and embodiments thereof are possible within the spirit and scope of the invention, the latter being defined by the appended claims.

The invention claimed is:

1. A handheld power tool, comprising:
    at least one vibration-cancelling device that has at least one cancellation spring and one cancellation mass, which cancellation mass is constructed of at least one first mass part and one second mass part;
    a mechanism housing configured to contain the drive components of the power tool and defining a chamber for receiving said at least one vibration-cancelling device; and
    a housing cap removably engageable to said mechanism housing to close said chamber and including a securing device for securing said at least one vibration-cancelling device to said housing cap for removal therewith.

2. The handheld power tool as defined by claim 1, wherein the first mass part has at most a mass four times as great as the second mass part.

3. The handheld power tool as defined by claim 2, wherein at least one mass part has a substantially homogeneous cross section in at least one direction.

4. The handheld power tool as defined by claim 3, wherein at least one mass part has a substantially standardized cross section in at least one direction.

5. The handheld power tool as defined by claim 2, wherein at least one mass part has a substantially standardized cross section in at least one direction.

6. The handheld power tool as defined by claim 2, wherein the first mass part and the second mass part are screwed together.

7. The handheld power tool as defined by claim 2, wherein the first mass part and the second mass part are joined together in material-locking fashion.

8. The handheld power tool as defined by claim 2, wherein the first mass part and the second mass part are braced to one another.

9. The handheld power tool as defined by claim 2, wherein the vibration-cancelling device has at least one spring receptacle, which is joined in form-locking, material-locking and/or force-locking fashion to the cancellation mass.

10. The handheld power tool as defined by claim 1, wherein at least one mass part has a substantially homogeneous cross section in at least one direction.

11. The handheld power tool as defined by claim 10, wherein at least one mass part has a substantially standardized cross section in at least one direction.

12. The handheld power tool as defined by claim 1, wherein at least one mass part has a substantially standardized cross section in at least one direction.

13. The handheld power tool as defined by claim 1, wherein the first mass part and the second mass part are screwed together.

14. The handheld power tool as defined by claim 1, wherein the first mass part and the second mass part are joined together in material-locking fashion.

15. The handheld power tool as defined by claim 1, wherein the first mass part and the second mass part are braced to one another.

16. The handheld power tool of claim 1, wherein the securing device is configured to removably secure said at least one vibration-cancelling device to said housing cap.

17. The handheld power tool of claim 16, wherein the securing device is configured to secure said at least one vibration-cancelling device only when said at least one cancellation spring is compressed.

18. A handheld power tool, comprising:
at least one vibration-cancelling device that has at least one cancellation spring and one cancellation mass configured for movement in a spring direction, which cancellation mass is constructed of at least one first mass part and one second mass part,
wherein the vibration-cancelling device has at least one spring receptacle, which is joined in form-locking, material-locking and/or force-locking fashion to the cancellation mass, said at least one spring receptacle configured to support the at least one cancellation spring transverse to said cancellation mass in a direction perpendicular to said spring direction.

19. A vibration-cancelling device of a handheld power tool as defined by claim 18.

* * * * *